United States Patent
Coulson et al.

(10) Patent No.: US 8,330,093 B2
(45) Date of Patent: Dec. 11, 2012

(54) APPARATUS AND METHOD FOR PREVENTING CHARGE PUMPING IN SERIES CONNECTED DIODE STACKS

(75) Inventors: Michael P. Coulson, Oxford (GB); Hajime Washio, Nara (JP); Benjamin J. Hadwen, Oxford (GB); Sunay Shah, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 524 days.

(21) Appl. No.: 12/692,874

(22) Filed: Jan. 25, 2010

(65) Prior Publication Data
US 2011/0114824 A1    May 19, 2011

Related U.S. Application Data

(60) Provisional application No. 61/261,880, filed on Nov. 17, 2009.

(51) Int. Cl.
G01J 1/44 (2006.01)
(52) U.S. Cl. ................................. 250/214 LS
(58) Field of Classification Search ............ 250/214 LS, 250/214.1, 214 R, 208.2; 327/143
See application file for complete search history.

(56) References Cited

U.S. PATENT DOCUMENTS

| | | | | |
|---|---|---|---|---|
| 5,323,068 A * | 6/1994 | Freitas | ........................... | 326/126 |
| 6,867,635 B2 * | 3/2005 | Westerman | .................... | 327/416 |
| 7,157,947 B2 * | 1/2007 | Chansungsan et al. | ....... | 327/143 |
| 2002/0070790 A1 * | 6/2002 | Westerman | .................... | 327/407 |
| 2005/0122138 A1 * | 6/2005 | Chansungsan et al. | ......... | 327/78 |
| 2005/0258341 A1 | 11/2005 | Nishikawa et al. | | |
| 2008/0290259 A1 | 11/2008 | Mathewson et al. | | |
| 2011/0043284 A1 * | 2/2011 | Zhao et al. | .................... | 330/277 |

FOREIGN PATENT DOCUMENTS

| | | |
|---|---|---|
| JP | 2006-013407 A | 1/2006 |
| JP | 2008-542706 A | 11/2008 |
| WO | 2008/044749 A1 | 4/2008 |

OTHER PUBLICATIONS

International Search Report for corresponding International Application No. PCT/JP2010/070636 mailed Mar. 1, 2011.

* cited by examiner

*Primary Examiner* — Seung C Sohn
(74) *Attorney, Agent, or Firm* — Renner, Otto, Boisselle & Sklar, LLP

(57) ABSTRACT

An ambient light sensor includes a first stack of at least two photodiodes, wherein a cathode of one of the at least two photodiodes is electrically connected to an anode of another of the at least two photodiodes. The ALS further includes a bias source for providing a bias voltage to the first stack, and at least one switch electrically connected to the first stack. The at least one switch is operative to periodically apply the bias voltage to and remove the bias voltage from the first diode stack.

29 Claims, 18 Drawing Sheets

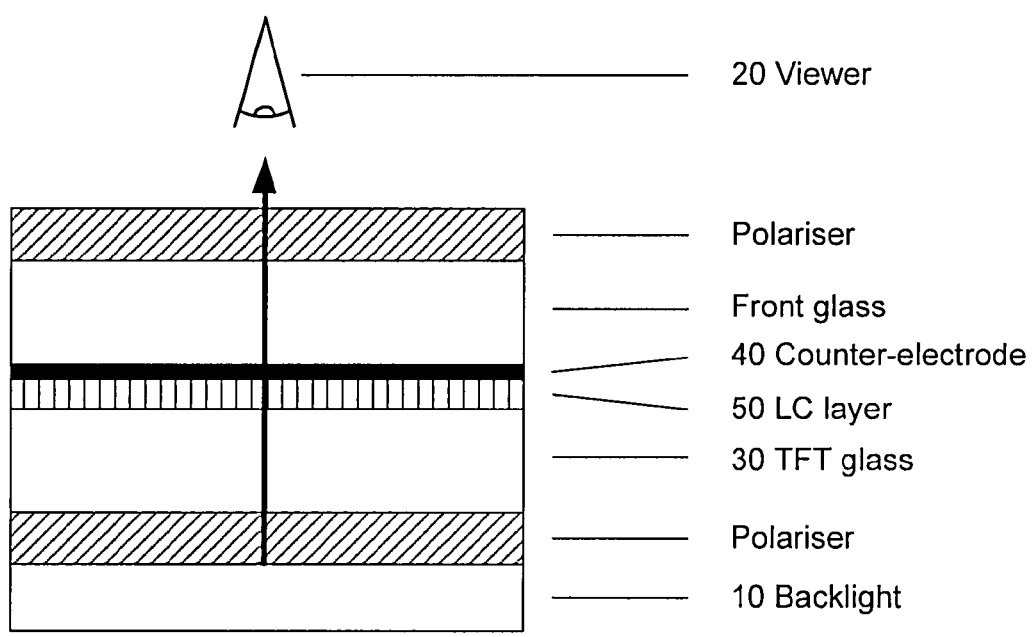
Figure 1
(Conventional)

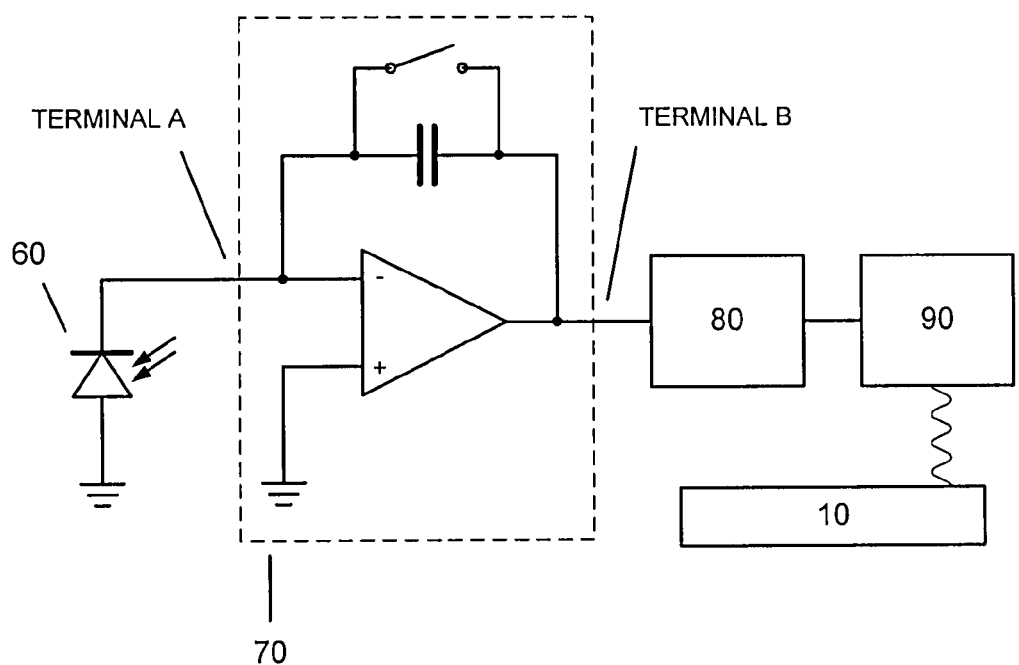
**Figure 3
(Conventional)**
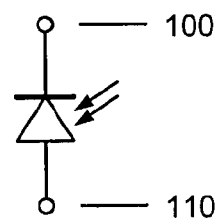
**Figure 4
(Conventional)**

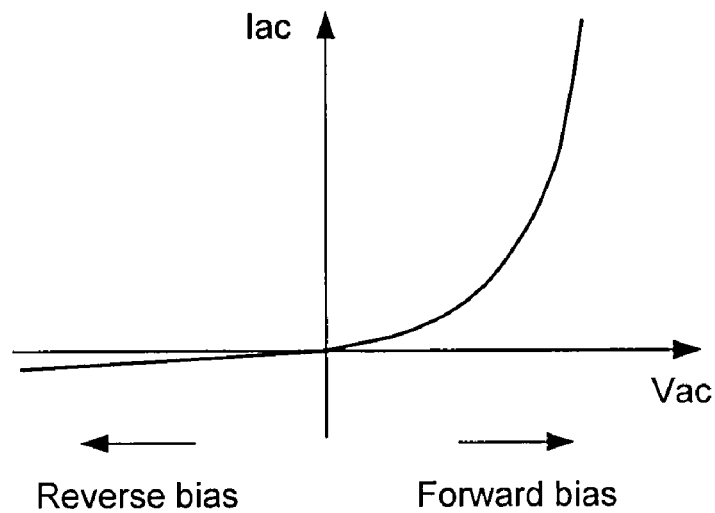
**Figure 5
(Conventional)**
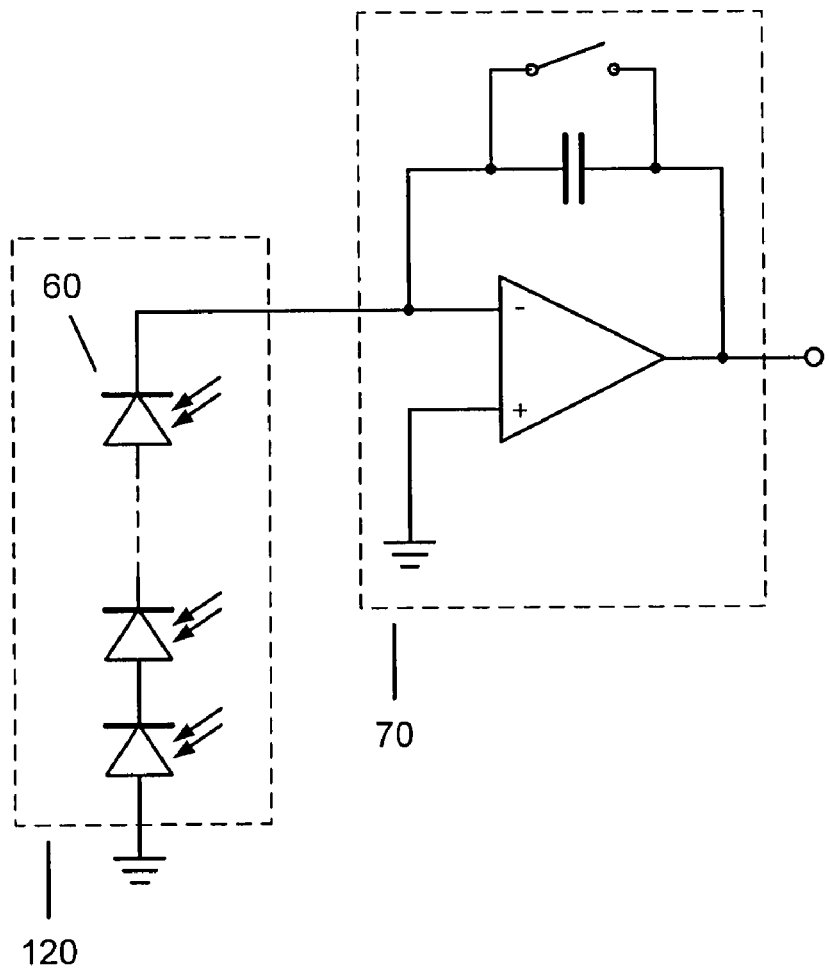
**Figure 6
(Conventional)**

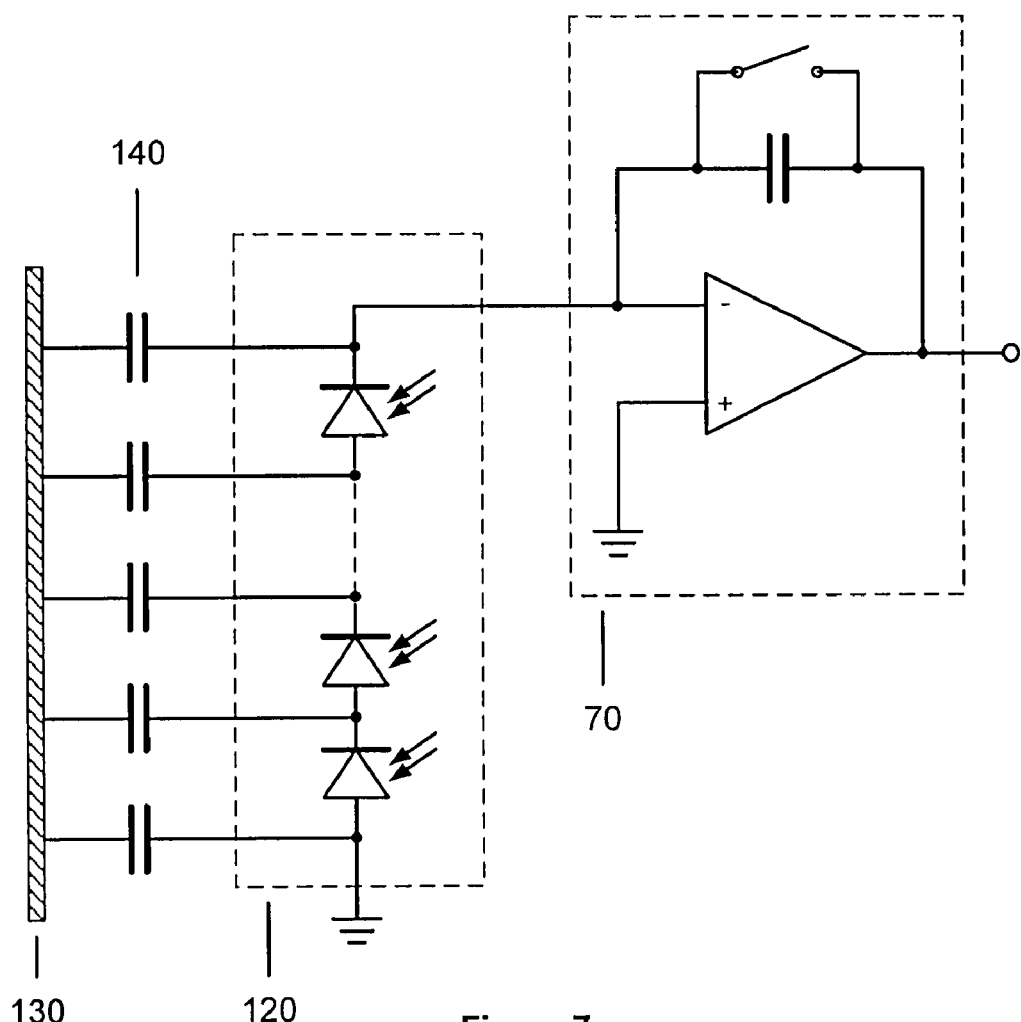
Figure 7
(Conventional)

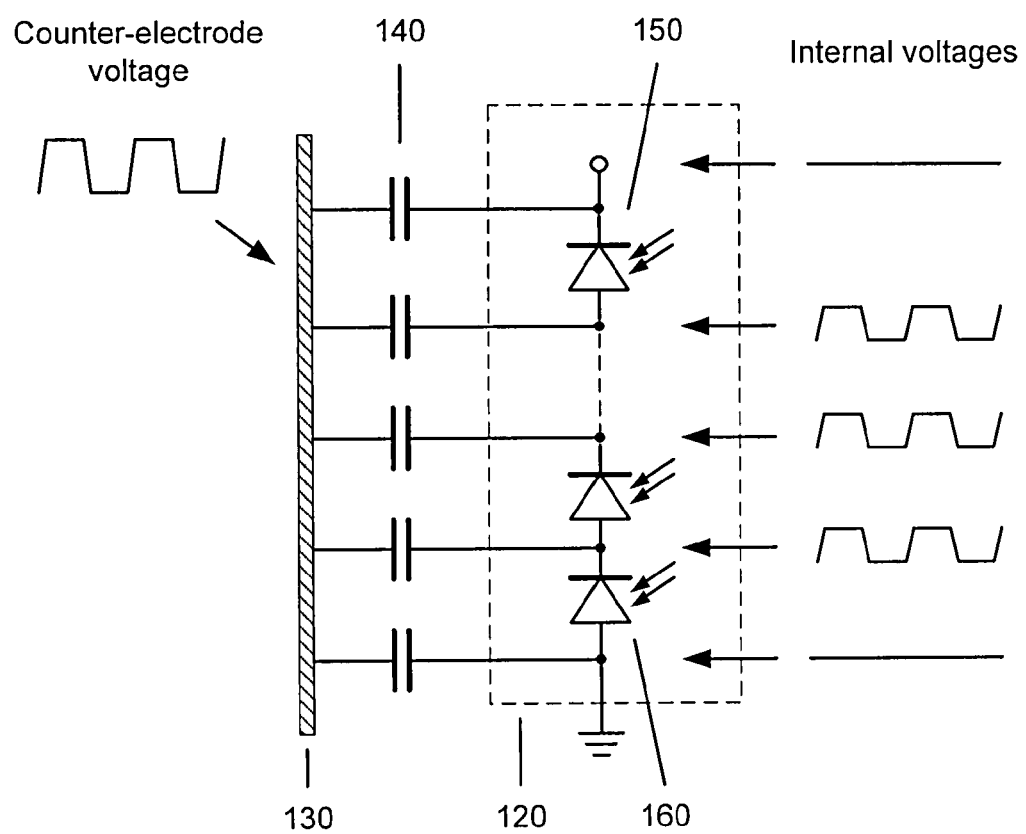
Figure 8
(Conventional)

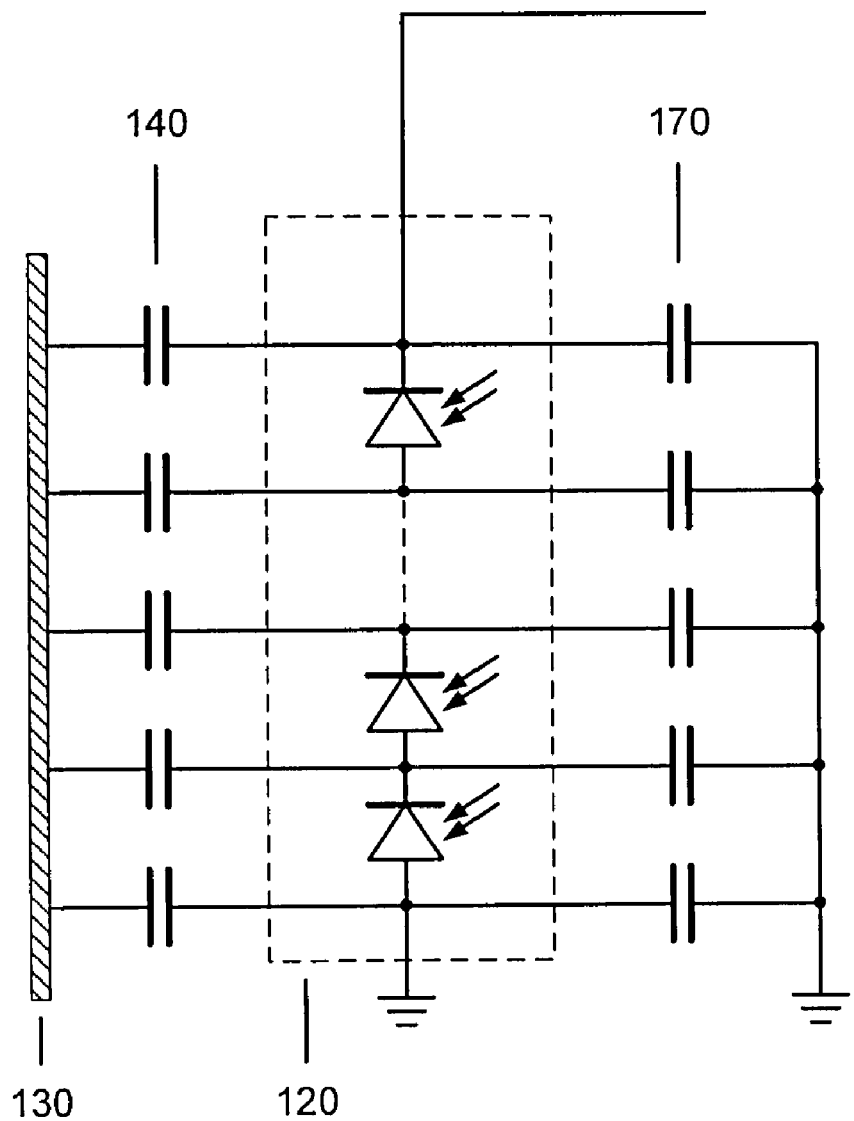
Figure 9
(Conventional)

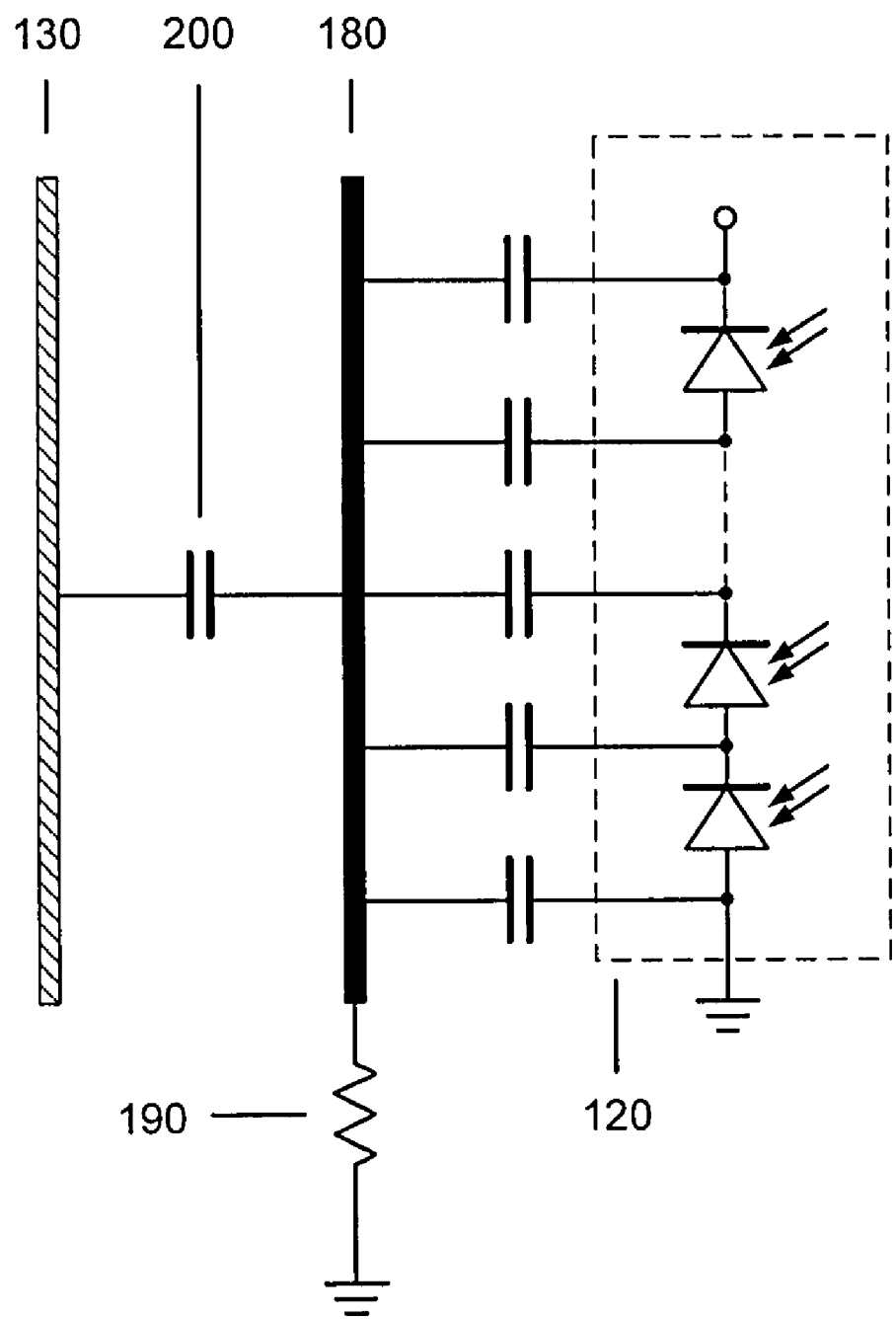
Figure 10
(Conventional)

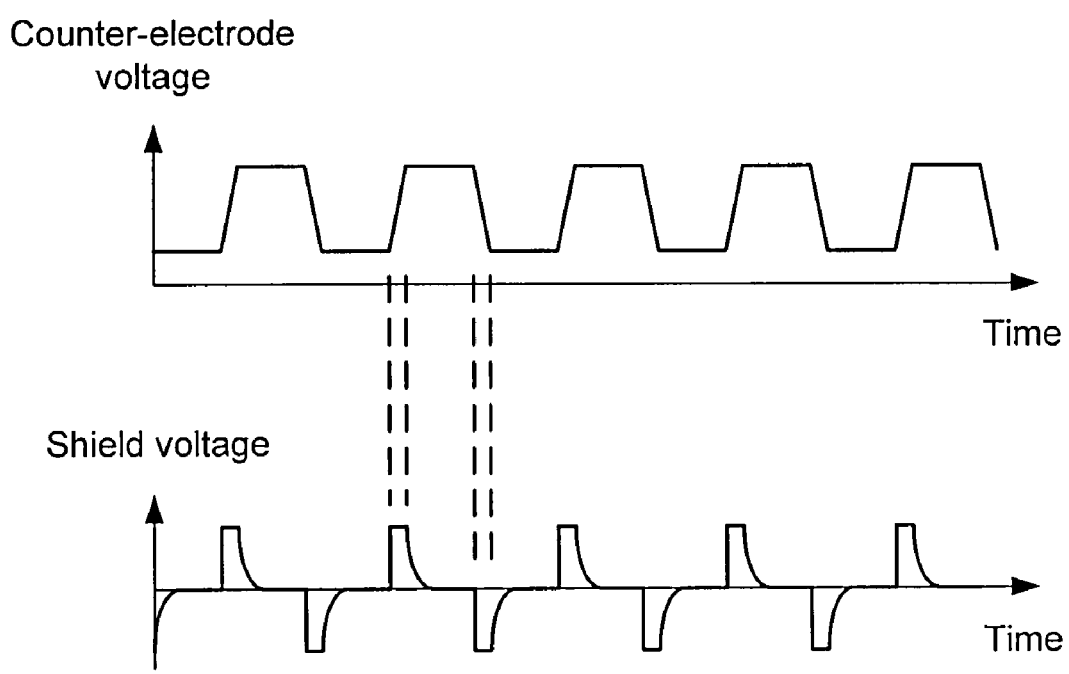
Figure 11
(Conventional)

US 8,330,093 B2

APPARATUS AND METHOD FOR PREVENTING CHARGE PUMPING IN SERIES CONNECTED DIODE STACKS

RELATED APPLICATION DATA

This application claims priority of U.S. Provisional Application No. 61/261,880 filed on Nov. 17, 2009, which is incorporated herein by reference in its entirety.

TECHNICAL FIELD

The present invention relates to light sensor circuits and, more particularly, to an apparatus and method for reducing average noise currents in series connected diode stacks of light sensor circuits used in display systems.

BACKGROUND OF THE INVENTION

FIG. 1 shows a simplified cross-section of a typical transmissive active-matrix liquid crystal display (AMLCD). The backlight 10 serves as a light source for illumination of the display. The transmission of light through the display, from the backlight 10 to the viewer 20, is controlled by the use of electronic circuits made from thin film transistors (TFTs). These TFTs are fabricated on a glass substrate (known as the TFT glass 30) and are operated in conjunction with a 'counter-electrode' 40 so as to vary the local electric field appearing across the liquid crystal (LC) layer 50. The local electric field dictates the optical properties of the LC material, and thus permits selective transmission of light from the backlight 10 through to the viewer 20.

If an electric field of non-zero mean is maintained over the LC material, it will suffer degradation. As the transmission of light through the LC material is dictated by the magnitude of the applied field, rather than its polarity, it is acceptable to periodically invert the polarity of the field so as to achieve a zero mean. Typically, this inversion is accomplished by varying both the voltages present on the TFT glass 30 and that present on the common counter-electrode 40. To this end, the counter-electrode 40 is typically driven with a square wave of several volts. The counter-electrode 40 signal may therefore act as a source of electrical interference to any other circuits integrated within the display.

The signal supplied to the counter-electrode 40, often termed 'VCOM', is generated by electronics incorporated into the display module. An integrated circuit (IC) in the host product (for example the mobile phone or portable computer which contains the display) generates further necessary display signals, such as HSYNC, CK and RGB. Examples of these signals can be found in FIG. 2.

Many products which contain displays (e.g., mobile phones and portable computers) benefit from an ability to control the intensity of the backlight according to conditions of ambient illumination. For example, under low ambient lighting conditions it is desirable to reduce the brightness of the display by reducing the intensity of the backlight. This serves to minimize consumption of power by the backlight, and prevents the user from suffering 'glare'.

In order to vary the intensity of the backlight in accordance with ambient lighting conditions, it is necessary to have some means for sensing the level of ambient light. An ambient light sensor (ALS) is used for this purpose, and there are advantages to integrating the ALS onto the TFT glass 30 (termed 'monolithic integration'). These advantages include reduction of the product's size, weight and manufacturing costs.

A typical ambient light sensor system, as shown in FIG. 3, contains the following elements:
  (a) A photodetection element (or elements) capable of converting incoming light to electrical current. An example of such a photodetection element is a photodiode 60.
  (b) Voltage bias generating and current measurement circuitry to control the photodetection element(s) and sense the photo-generated current 70. This circuitry will typically take the form of an integrator.
  (c) Output circuitry 80 to supply an output signal (analog or digital) representing the measured ambient light level.
  (d) A means of adjusting the display operation 90 based on the measured ambient light level, for example by controlling the intensity of the backlight 10.
The operation of such components is described in WO2008/044749A1.

In the case of an AMLCD having a monolithically integrated ambient light sensor, the photodetection device used must be compatible with the TFT process employed in the manufacture of the TFT glass 30. A well-known photodetection device compatible with the standard TFT process is the lateral thin-film poly-silicon P-I-N diode: a two terminal device having a cathode 100 and an anode 110, whose circuit representation is shown in FIG. 4.

The current flowing in the P-I-N diode is a function of three quantities: temperature, the amount of illumination incident upon the diode, and the potential difference which appears across its terminals (the 'bias voltage'). The asymmetric relationship between diode current (Iac) and applied bias voltage (Vac) is shown in FIG. 5 (for the case of zero illumination). The current which flows on account of a non-zero bias voltage is detrimental to the operation of an ambient light sensor, as it cannot be distinguished from that which flows due to incident illumination. This component of the diode current is termed the 'dark current', and may be significantly temperature dependent.

As the dark current may scale exponentially with the photodiode bias voltage, it is desirable to minimize this applied bias. Ideally, the diode's terminals would be maintained at identical potentials. However, such precision voltage control can be difficult to achieve in practice. It is therefore wise to series connect many photodiodes, so as to divide any applied potential across numerous devices. FIG. 6 shows a series connected photodiode stack, as described in WO2008/044749A1, finding use in an ALS circuit. The stack of n series connected photodiodes 120 is connected to bias generating and current measurement circuitry 70. The bias generating and current measurement circuitry 70 measures diode current whilst maintaining a constant (and ideally zero) bias voltage across the diode stack 120. Any residual bias voltage, VB, appearing across the diode stack 120 is divided between the individual devices, such that each photodiode experiences a lesser bias of VB/n. Dark current from the photodiode is therefore reduced.

However, series connected diodes have a disadvantage when employed within an electrically noisy environment. As shown in FIG. 7, electrical interference from the counter-electrode 130 will couple to points within the diode stack 120, via parasitic coupling capacitances 140. Normally, the effect of electrical interference in sensor circuits may be reduced by techniques such as low pass filtering or averaging of the sensor output. Unfortunately, the asymmetric conduction characteristic of the diode, shown in FIG. 5, may cause a net forward current to flow in the presence of electrical interference. This net forward current cannot be cancelled out by time-averaging or integration, and cannot be separated from the light dependent diode current.

This undesirable effect is explained as follows, with reference to FIG. 8. Upon a rising edge of the counter-electrode voltage, positive voltage steps will be seen at each point throughout the stack of series connected diodes 120. However, the anode and cathode ends of the stack 120, connected to ground and to the bias circuitry respectively, will be maintained at constant voltage. The diode 150 at the cathode-end of the series connected stack 120 will therefore become temporarily forward biased, and will pass a light-independent current in the forward direction. At the same time, the diode 160 at the anode-end of the series connected stack 120 will become temporarily reverse biased, yet will pass little current in the reverse direction. A net current therefore passes out of the series connected diode stack 120 in the forward direction.

When an equally sized falling edge appears on the counter-electrode 130, introducing negative voltage steps within the series connected diode stack 120, the cathode end diode 150 will be reverse biased, and will pass little current. However, the anode end diode 160 will now be forward biased, and will allow a net forward current to pass into the stack 120.

It is clear that, over a complete noise cycle, a net charge will be 'pumped' in the forward direction through the series connected diode stack 120. This net current is indistinguishable from that which arises due to illumination, and therefore corrupts the ambient light measurement.

It should be noted that although the anode of the diode stack has been shown connected to ground in FIGS. 3 to 9, a connection to any dc voltage source would be equally valid.

It should also be noted that, due to the proximity of the diode stack to other layout features, capacitance may be present between nodes within the diode stack and ground (or other dc voltage sources). This is shown in FIG. 9. In the case where either the parasitic capacitance 140 to the noise source or the capacitance 170 to the ground (or dc voltage source) is non-uniformly distributed across the diode stack, the size of the voltage perturbations within the diode stack may vary along its length. Such uneven voltage perturbations may increase the transient forward bias voltages across diodes within the stack, raising the charge pumping current.

The 'charge pumping' problem can be lessened by fabrication of a conductive shield layer 180 above the diode stack 120. Electrically, this appears as shown in FIG. 10. Although the conductive shield 180 is still capacitively coupled to the counter-electrode 130, it is also grounded via a low resistance path 190, minimizing the voltage perturbations which occur on it. The waveform appearing on the shield 180 may then resemble that shown in FIG. 11. Only small voltage steps will therefore appear within the diode stack 120 on account of the counter-electrode waveform. As the current flowing in a forward biased diode is strongly dependent upon the magnitude of that forward bias voltage, smaller voltage perturbations within the stack 120 yield a lower charge pumping current. Nonetheless, it may not be possible to reduce the shield resistance to zero and hence the voltage perturbations sufficiently, and so the residual charge pumping current may still be unacceptable.

Alternatively, the charge pumping problem can be eliminated by adoption of a display architecture whereby the counter-electrode voltage is constant. To ensure that the LC material experiences a zero-mean electric field, such architectures periodically invert the polarity of the voltages present on the TFT glass 30, relative to that present on the counter-electrode 130. However, higher absolute voltages must be generated on the TFT glass 30 of such displays, increasing complexity of the drive circuits. The bezel area (the non-display region which houses circuits surrounding the pixel matrix) may also be larger in displays of this architecture.

SUMMARY OF THE INVENTION

The present invention provides an apparatus and method that reduces the average charge pumping current by periodically disconnecting the series connected diode stack from one or more of the bias voltages to which it is connected. This concept is shown in FIG. 12, where an anode-end switch 210 and cathode-end switch 220 have been added to the series connected diode stack 120. Disconnection of the diode stack is performed whenever interference sources cause transient internal voltages to be generated. Whilst disconnected from the bias source, transient voltages are generated uniformly at every point within the diode stack 120, and equally at the endmost nodes 230 and 240. For this reason no diode experiences a potential difference across its terminals, and no charge pumping current flows. Once the interference spike has passed, and voltages within the stack have returned to their original values, the stack may be reconnected to its bias source.

It is believed that the device and method in accordance with the present invention may also be applicable to cases where the diode stack is biased with a fixed forward current, and the resultant forward bias voltage is measured. Under these circumstances the charge pumping problem assists forward conduction through the stack, and so reduces the forward bias voltage measured under a given forward bias current.

The apparatus and method in accordance with the present invention are able to suppress charge pumping without requiring adoption of an alternative display architecture, where the counter-electrode voltage remains static.

According to one aspect of the invention, an ambient light sensor (ALS) includes: a first diode stack including at least two photodiodes, wherein a cathode of one of the at least two photodiodes is electrically connected to an anode of another of the at least two photodiodes; a bias source for providing a bias voltage to the first diode stack; and at least one switch electrically connected to the first stack, said at least one switch operative to selectively apply the bias voltage to and remove the bias voltage from the first diode stack.

According to one aspect of the invention, the at least one switch comprises a first switch and a second switch, and wherein the first switch is electrically connected between an end-most anode of the first diode stack and signal common, and the second switch is electrically connected between an end-most cathode of the first diode stack and the bias source.

According to one aspect of the invention, the ALS further includes at least one additional diode stack including at least two photodiodes, wherein a cathode of one of the at least two photodiodes is electrically coupled to an anode of another of the at least two photodiodes, and wherein the first diode stack and the at least one additional diode stack are electrically connected to one another in a series connection.

According to one aspect of the invention, the at least one switch comprises a plurality of switches, and one of the plurality of switches electrically couples the first stack to the at least one additional stack.

According to one aspect of the invention, the at least one switch comprises a plurality of switches, and one of the plurality of switches electrically couples the cathode of the one photodiode of the first stack to the anode of the another photodiode of the first stack.

According to one aspect of the invention, another of the plurality of switches electrically couples the cathode of the one photodiode of the additional diode stack to the anode of the another photodiode of the additional diode stack.

According to one aspect of the invention, the at least one switch comprises at least one of an n-channel transistor or a p-channel transistor.

According to one aspect of the invention, the ALS further includes a controller for controlling an open and closed state of the at least one switch.

According to one aspect of the invention, a display module includes: the ALS as set forth herein; and a counter-electrode for varying a local electric field, the counter-electrode capacitively coupled to the first stack and subjected to a first electrical waveform, wherein the controller is configured to open and close the at least one switch to correspond with transitions in the first electrical waveform.

According to one aspect of the invention, the controller is configured to open and close the at least one switch to correspond with a period of the first electrical waveform.

According to one aspect of the invention, the controller is configured to close the at least one switch during high or low half cycles of the first electrical waveform.

According to one aspect of the invention, the controller is configured to close the at least one switch once every second high pulse or every second low pulse of the first electrical waveform.

According to one aspect of the invention, the controller is configured to open the at least one switch during at least one of rising or falling edges of the first electrical waveform.

According to one aspect of the invention, the display module further includes a shield layer capacitively coupled to the first stack, said shield layer subjected to a second electrical waveform different from the first electrical waveform, wherein the controller is configured to close the at least one switch following each transition of the first electrical waveform.

According to one aspect of the invention, the second waveform is derived from the first waveform.

According to one aspect of the invention, the display module further includes a shield layer capacitively coupled to the first stack, said shield layer subjected to a second electrical waveform different from the first electrical waveform, wherein the controller is configured to close the at least one switch following each second transition of the first electrical waveform.

According to one aspect of the invention, the controller is configured to open the at least one switch before a new transition of the first electrical waveform.

According to one aspect of the invention, the at least one switch is electrically connected between an end-most cathode of the first diode stack and the bias source, and wherein the controller is configured to open the at least one switch every low half cycle of the first electrical waveform.

According to one aspect of the invention, the at least one switch is electrically connected between an end-most anode of the first diode stack and signal common, and wherein the controller opens the at least one switch every high half cycle of the first electrical waveform.

According to one aspect of the invention, the controller is configured to close the at least one switch only when the first electrical waveform is static.

According to one aspect of the invention, the display module further includes a backlight.

According to one aspect of the invention, a method for preventing charge pumping in a series connected diode stack of a display device's ambient light sensor (ALS) is provided, wherein the diode stack includes at least two photodiodes, and a cathode of one of the at least two photodiodes is electrically connected to an anode of another of the at least two photodiodes, the ALS including a bias source for generating a bias voltage for the diode stack, and the display device including a counter electrode for generating an electric field. The method includes selectively applying the bias voltage to and removing the bias voltage from the diode stack based on transient voltages on the counter electrode.

According to one aspect of the invention, selectively applying the bias voltage to and removing the bias voltage from the diode stack includes using a switch to apply the bias voltage to and remove the bias voltage from the diode stack.

According to one aspect of the invention, selectively applying the bias voltage to and removing the bias voltage from the diode stack includes applying and removing the bias voltage based on a periodic waveform applied to the counter-electrode.

According to one aspect of the invention, selectively removing the bias voltage includes removing the bias voltage from the stack with each rising or falling edge of the periodic waveform.

According to one aspect of the invention, selectively removing the bias voltage includes removing the bias voltage every second high or low pulse of the periodic waveform.

According to one aspect of the invention, the at least one switch is electrically connected between an end-most cathode of the diode stack and the bias source, and wherein selectively removing the bias voltage includes opening the at least one switch on a low pulse of the periodic waveform.

According to one aspect of the invention, the at least one switch is electrically connected between an end-most anode of the diode stack and signal common, and wherein selectively removing the bias voltage includes opening the at least one switch on a high pulse of the periodic waveform.

According to one aspect of the invention, the display device includes a shield layer capacitively coupled to the diode stack, and wherein selectively applying the bias voltage to the diode stack includes applying the bias voltage following each transient on the counter electrode.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 1 is a cross section of a typical transmissive active matrix liquid crystal display (AMLCD).

FIG. 3 is a schematic diagram representing a simple ALS, built around an integrator and employing a single photodiode as a photosensitive element.

FIG. 4 is the circuit symbol used for a photodiode.

FIG. 5 is a graph showing a simplified current vs. voltage characteristic for a photodiode, when no light is present.

FIG. 6 is a schematic diagram showing an ALS of the type depicted by FIG. 3, yet which employs a stack of series connected photodiodes.

FIG. 7 is a schematic diagram showing the mechanism by which electrical interference couples to nodes within the series connected diode stack.

FIG. 8 is a schematic diagram illustrating how the endmost diodes of FIG. 7 become forward biased in the presence of electrical interference.

FIG. 9 is a schematic diagram illustrating how capacitance may also exist between the diode stack and ground (or another DC voltage).

FIG. 10 is a schematic diagram showing how a grounded shield may be used to minimize the electrical interference which couples to the stack of series connected photodiodes.

FIG. 11 is a graph showing the voltage waveforms which may be expected to arise on the counter-electrode and the shield.

DETAILED DESCRIPTION OF THE INVENTION

Figure 2:
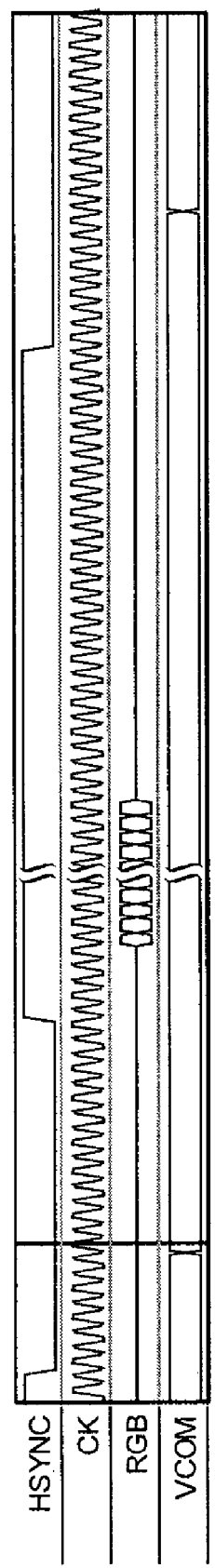
FIG. 2 illustrates exemplary display signals that may be used in a display system.
Figure 12:
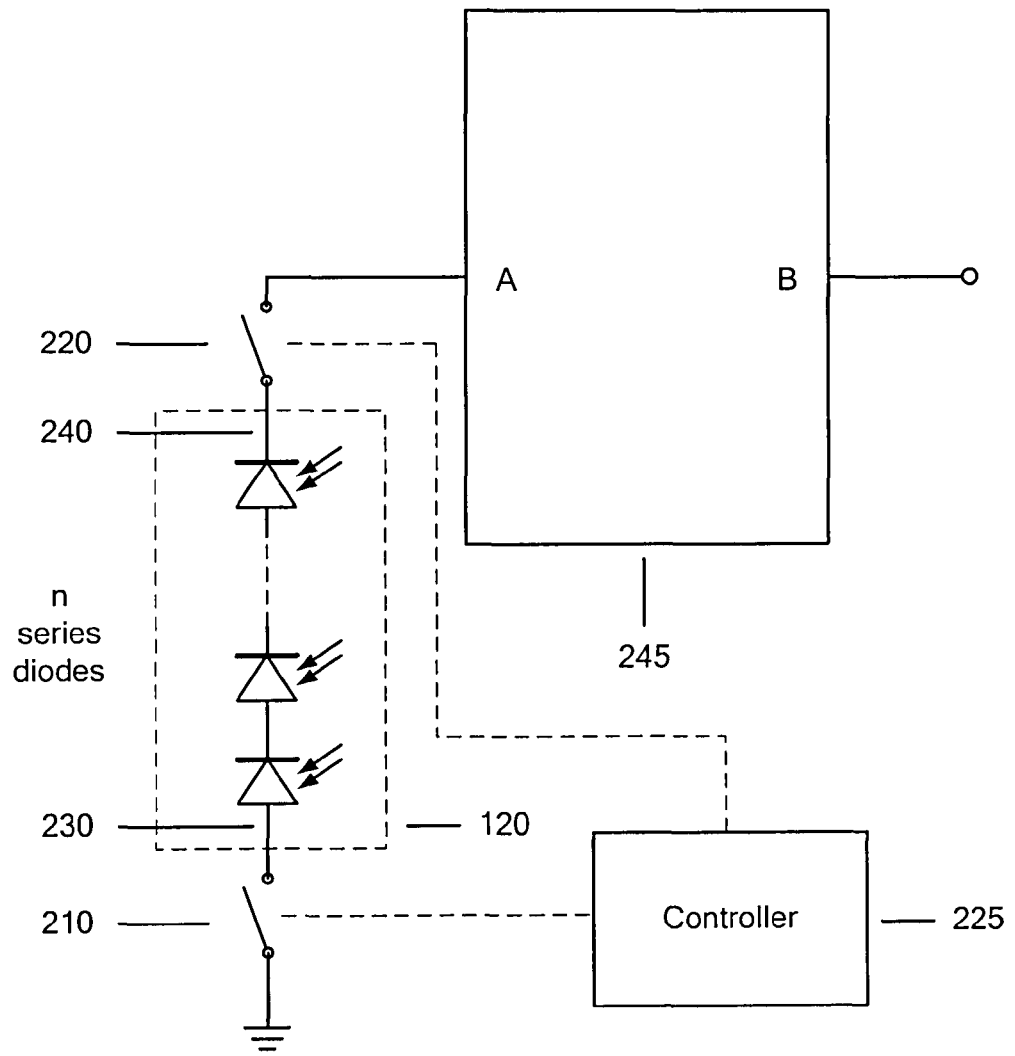
FIG. 12 is a schematic diagram which shows periodic disconnection of the series connected photodiodes from the bias generating and current measurement circuitry in accordance with an embodiment of the present invention.
Figure 13:
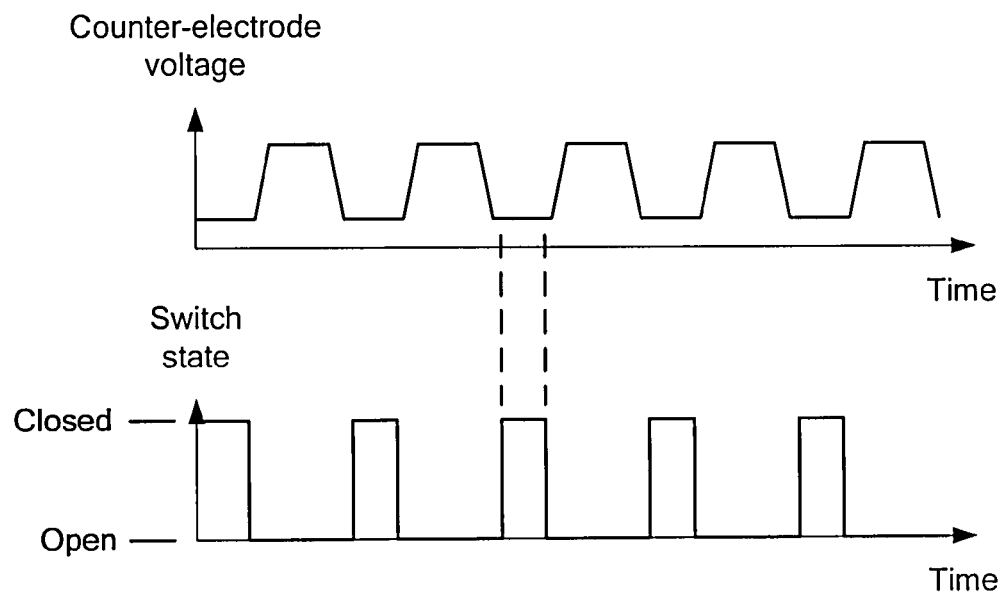
FIG. 13 is a graph showing the variation of the counter-electrode voltage with time, together with a proposed timing for the switches in accordance with an embodiment of the invention.

A device in accordance with a first embodiment of the invention is shown in FIGS. 12 and 13, and finds use in situations where no conductive shield layer is present above the diode stack. FIG. 12 is a schematic diagram showing a stack 120 of at least two series connected photodiodes, arranged such that the cathode of one is connected to the anode of the next. The end-most anode 230 is connected to one terminal of a simple two terminal switch 210, the other terminal of this switch being connected to ground. The end-most cathode 240 is connected to one terminal of a second two terminal switch 220, the other end of this switch being connected to terminal 'A' of bias and current measurement circuitry 245. This bias generating and current measurement circuitry 245 is embodied in the form of an integrator 70 as shown in FIG. 3, and described in WO2008/044749A1. The switches 210 and 220 are controlled via a controller 225, which commands the switches to open and close using known techniques. Although not shown, the controller 225 is operatively coupled to the counter-electrode 130 and/or shield layer 180, and commands the switches based on the electrical waveforms present on the counter-electrode and/or shield layer. The switches 210 and 220 may be implemented as either n-channel transistors, p-channel transistors, or an appropriate combination of the two. The switches 210 and 220 are operated as shown in FIG. 13 in the case where the counter-electrode voltage directly couples, via parasitic capacitance, to nodes within the diode stack. FIG. 13 shows the counter-electrode voltage rising and falling as a periodic square wave, having finite rise and fall time. The switches are closed during one half-period of each cycle of the counter-electrode waveform, and are open during rising or falling edges of the counter-electrode waveform. To guarantee an acceptable level of charge pumping, the switches are closed when voltages developed within the series connected diode stack 120 are sufficiently small (i.e., small enough to reduce the average noise current to an acceptable level for the sensor circuit). This will be the case as soon as the counter-electrode signal has settled to its new value. Although FIG. 13 shows the switches being closed during the low half-cycle of the counter-electrode voltage, they may instead be closed during the high half-cycle.

The signals required to drive switch 210 and switch 220 may easily be generated by the controller IC in the display module which generates the $V_{COM}$ signal. The manner in which these signals may be generated will be evident to those skilled in the art.

Figure 15:
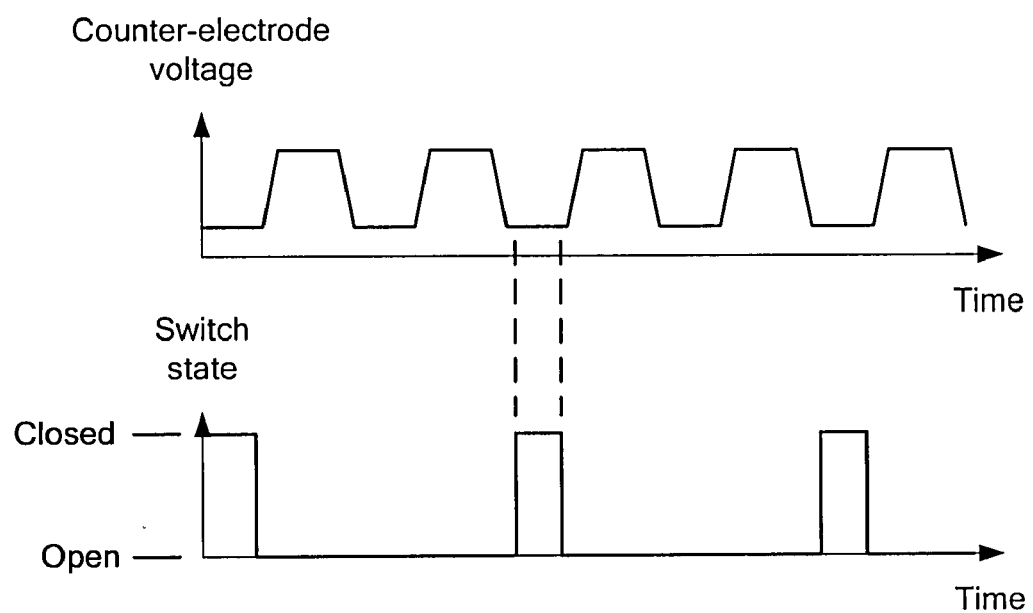
FIG. 15 is a graph showing the variation of the counter-electrode voltage with time, together with an alternative timing for the switches in accordance with an embodiment of the invention.

FIGS. 12 and 15 show a device in accordance with a second embodiment of the invention, whereby the switches 210 and 220 are operated as shown in FIG. 15. The switches close only when the counter-electrode voltage is static, as was shown in FIG. 13. However, in FIG. 15 the switches close once every second low pulse or once every second high pulse of the counter-electrode waveform, rather than once every period. This may be advantageous, as it reduces the rate at which the switches are being operated and hence reduces the frequency of noise which couples from the switch signals themselves to other parts of the circuitry (such as to the bias generation and current measurement circuitry 245).

Figure 16:
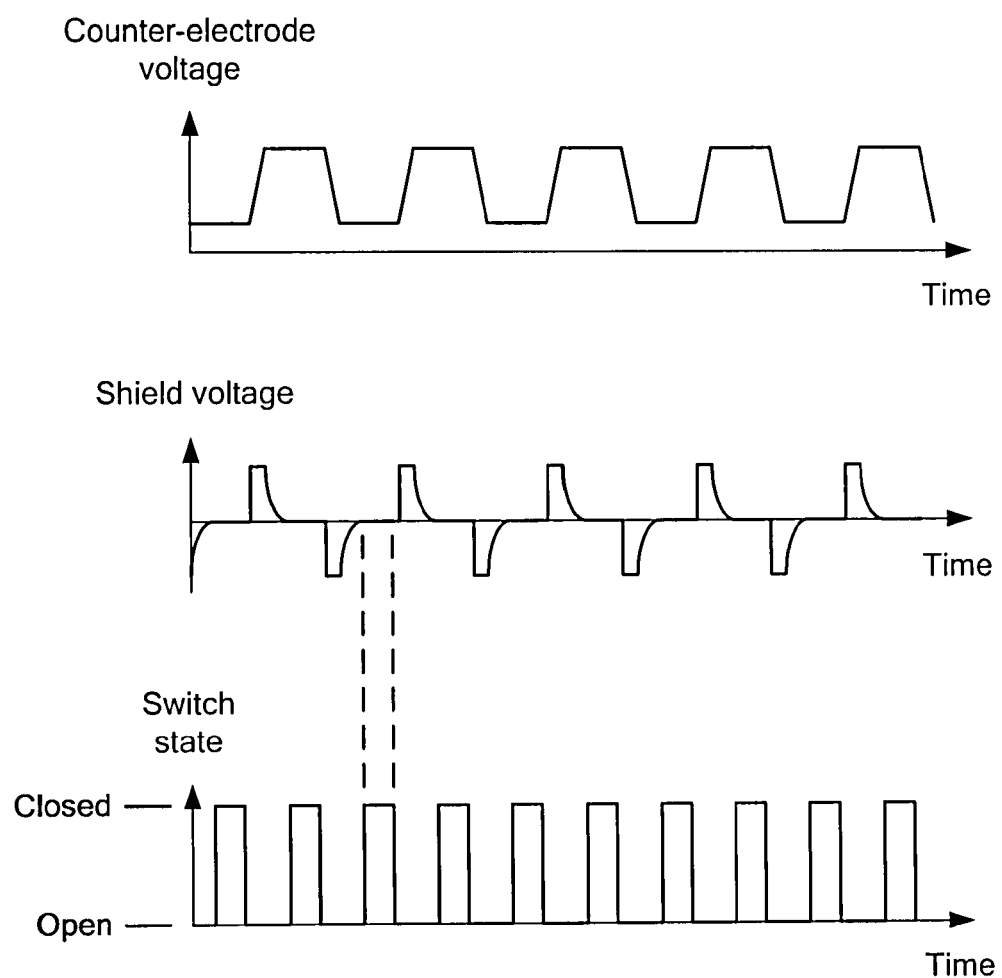
FIG. 16 is a graph showing the variation of the counter-electrode voltage with time, together with a corresponding variation in the shield voltage with time, and a proposed timing for the switches in accordance with an embodiment of the invention.

FIGS. 12 and 16 show a device in accordance with a third and preferred embodiment of the invention, whereby switches 210 and 220 are operated in the manner shown in FIG. 16. The third embodiment is used when a shield layer 180 is present above the diode stack 120. FIG. 16 shows that the switches are closed following each transition of the counter-electrode voltage and once the voltage upon the conductive shield layer has settled. A short delay is utilized between each transition ending and the switches being closed, allowing time for transient voltages within the diode stack to decay to levels which will not produce a significant charge pumping current. On each occasion the switches are opened before a new transition of the counter-electrode voltage occurs, as this will be accompanied by transient voltages within the stack. This embodiment is preferred because the switches may be opened more frequently than other embodiments. This is beneficial when the diode stack current must be determined within a short time.

Figure 17:
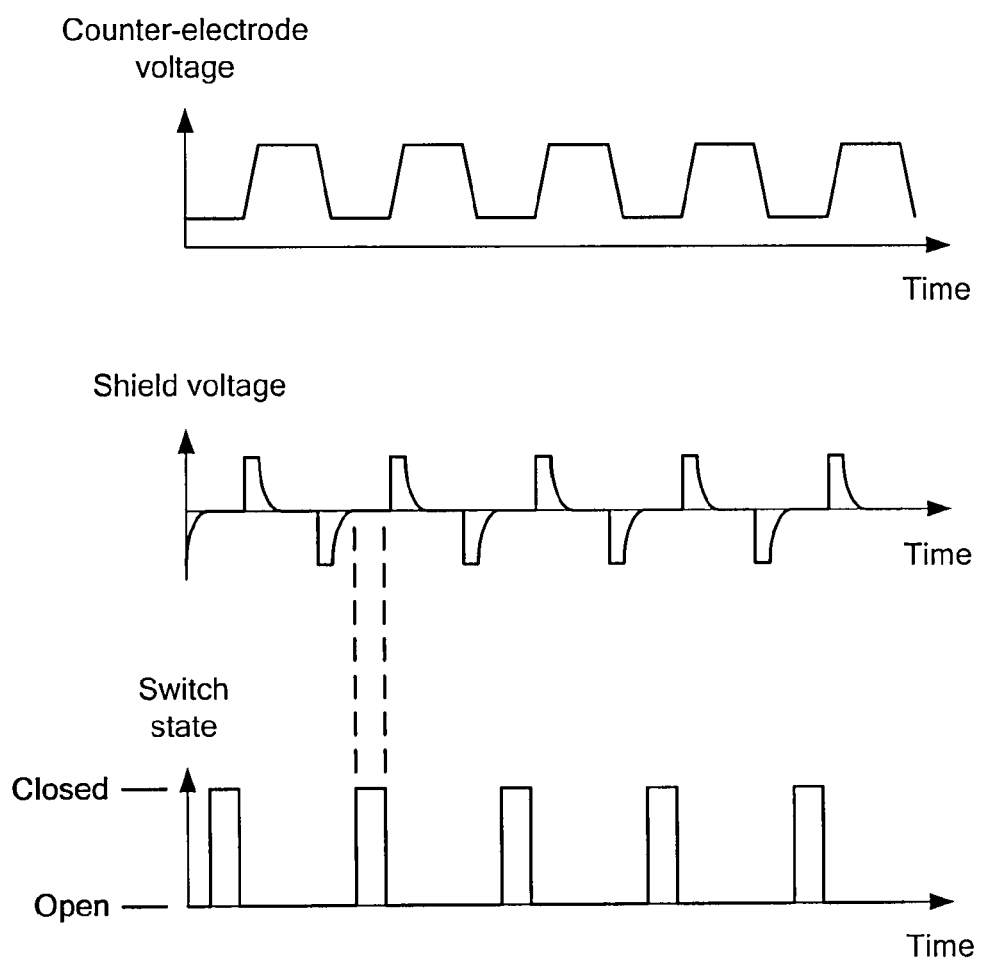
FIG. 17 is a graph showing the variation of the counter-electrode voltage with time, together with a corresponding variation in the shield voltage with time, and an alternative timing for the switches in accordance with an embodiment of the invention.

FIGS. 12 and 17 show a device in accordance with a fourth embodiment of the invention, applicable in cases where a conductive shield layer is fabricated above the diode stack, as previously described. FIG. 17 shows that switches 210 and 220 are operated following decay of transient voltage present within the diode stack 120, in a manner similar to that previously shown in FIG. 16. However, in FIG. 17 the switches are only closed once every two transitions of the counter-electrode voltage. This may be advantageous, as it reduces the rate at which the switches are being operated and hence reduces the frequency of noise which couples from the switch signals themselves to other parts of the circuitry (such as to the bias generation and current measurement circuitry 245).

Figure 18:
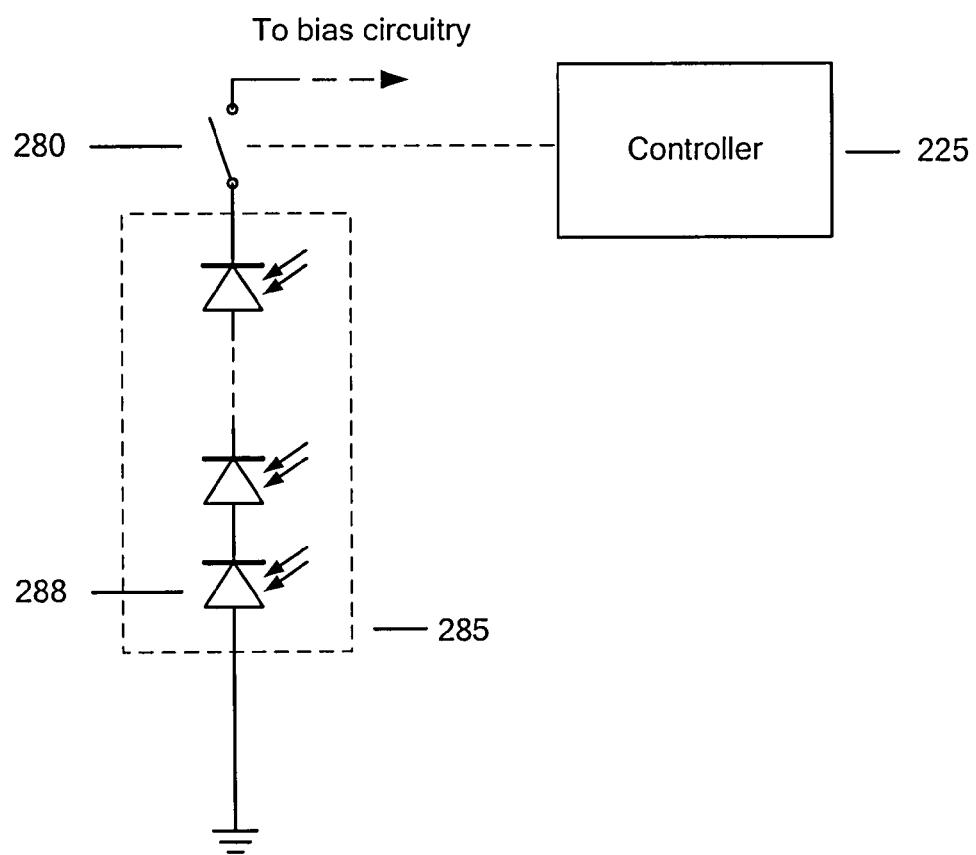
FIG. 18 is a schematic showing a diode stacks connected to a single switch. The diode stack is permanently connected to the bias generation and current measurement circuitry in accordance with an embodiment of the invention.

FIGS. 18 and 13 show a device in accordance with a fifth embodiment of the invention, whereby only one switch 280 is employed, and this switch is connected between the bias circuitry and the cathode end of the series connected diode stack 285. The switch 280 is operated according to FIG. 13. This embodiment is advantageous in that fewer components are required, relative to the first embodiment. However, the switch is now opened only on the low half-cycle of the counter-electrode voltage, and not on the high half-cycle. This ensures that only positive voltages are developed within the diode stack 285, ensuring that the diode 288 at the anode end of the stack is never forward biased even though its anode is permanently connected to ground.

Figure 14:
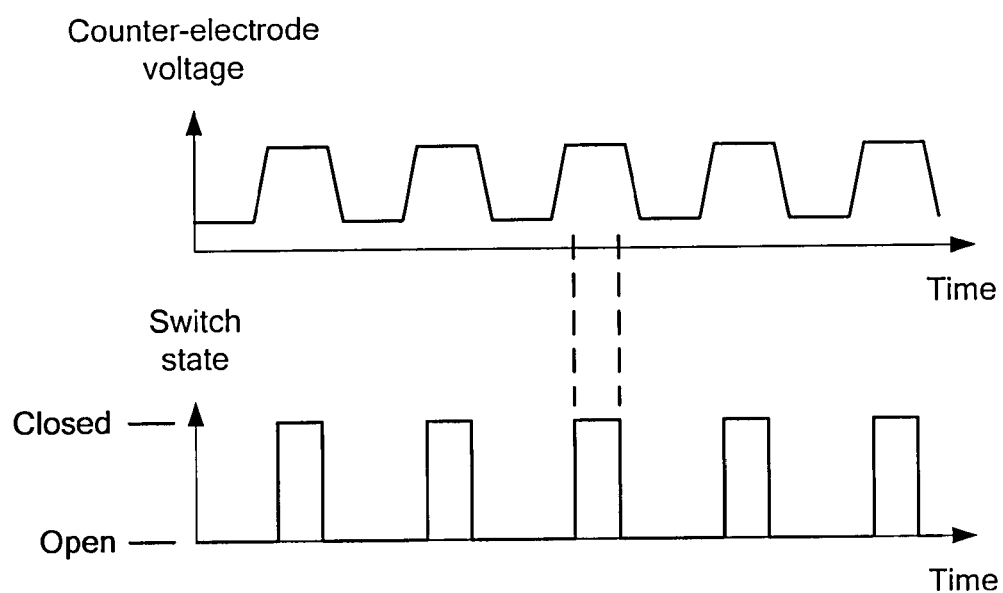
FIG. 14 is a graph showing the variation of the counter-electrode voltage with time, together with a proposed timing for the switches in accordance with an embodiment of the invention.
Figure 19:
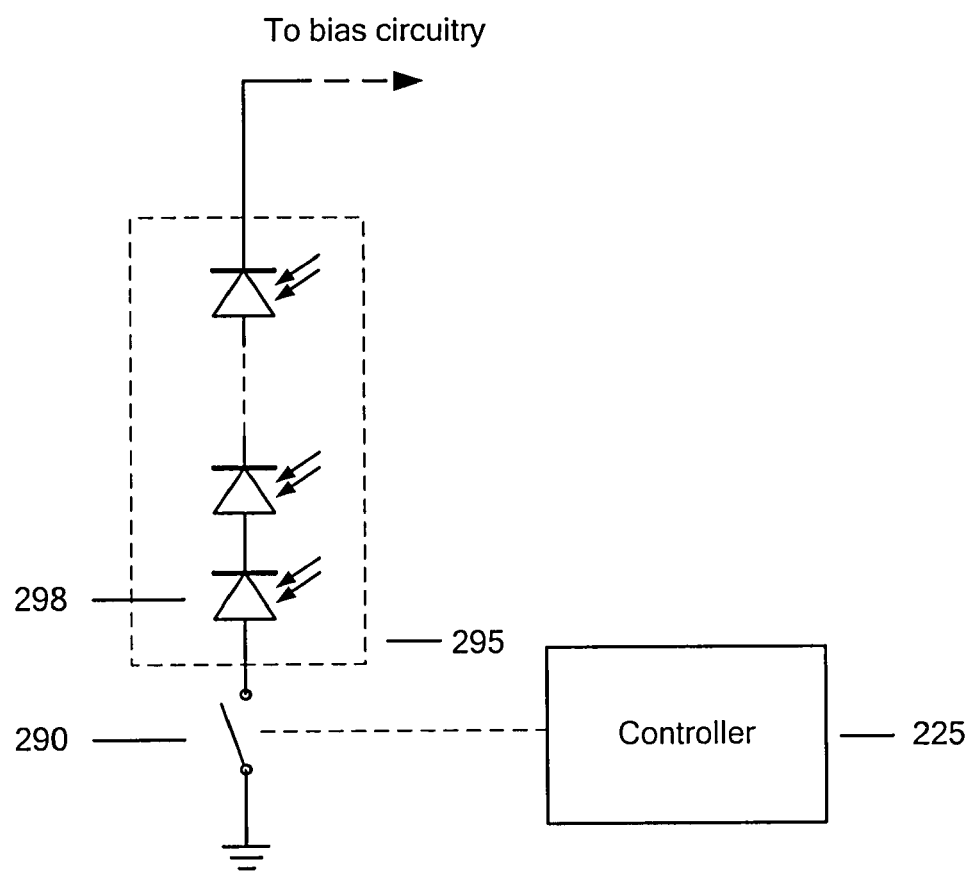
FIG. 19 is a schematic showing a diode stack connected to a single switch, wherein the diode stack is permanently connected to ground in accordance with an embodiment of the invention.

FIGS. 19 and 14 show a device in accordance with a sixth embodiment of the invention, whereby only one switch 290 is employed, and this switch is connected between ground and the anode end of the series connected diode stack 295. The switch 290 is operated as shown in FIG. 14. This embodiment is advantageous in that fewer components are required, relative to the first embodiment. However, as shown in FIG. 14, the switch is opened only on the high half-cycle of the counter-electrode voltage, and not on the low half-cycle. This ensures that only negative voltages are developed within the diode stack 295, ensuring that the diode 298 at the cathode end of the stack is never forward biased even though its cathode is permanently connected to the dc bias voltage.

Figure 20:
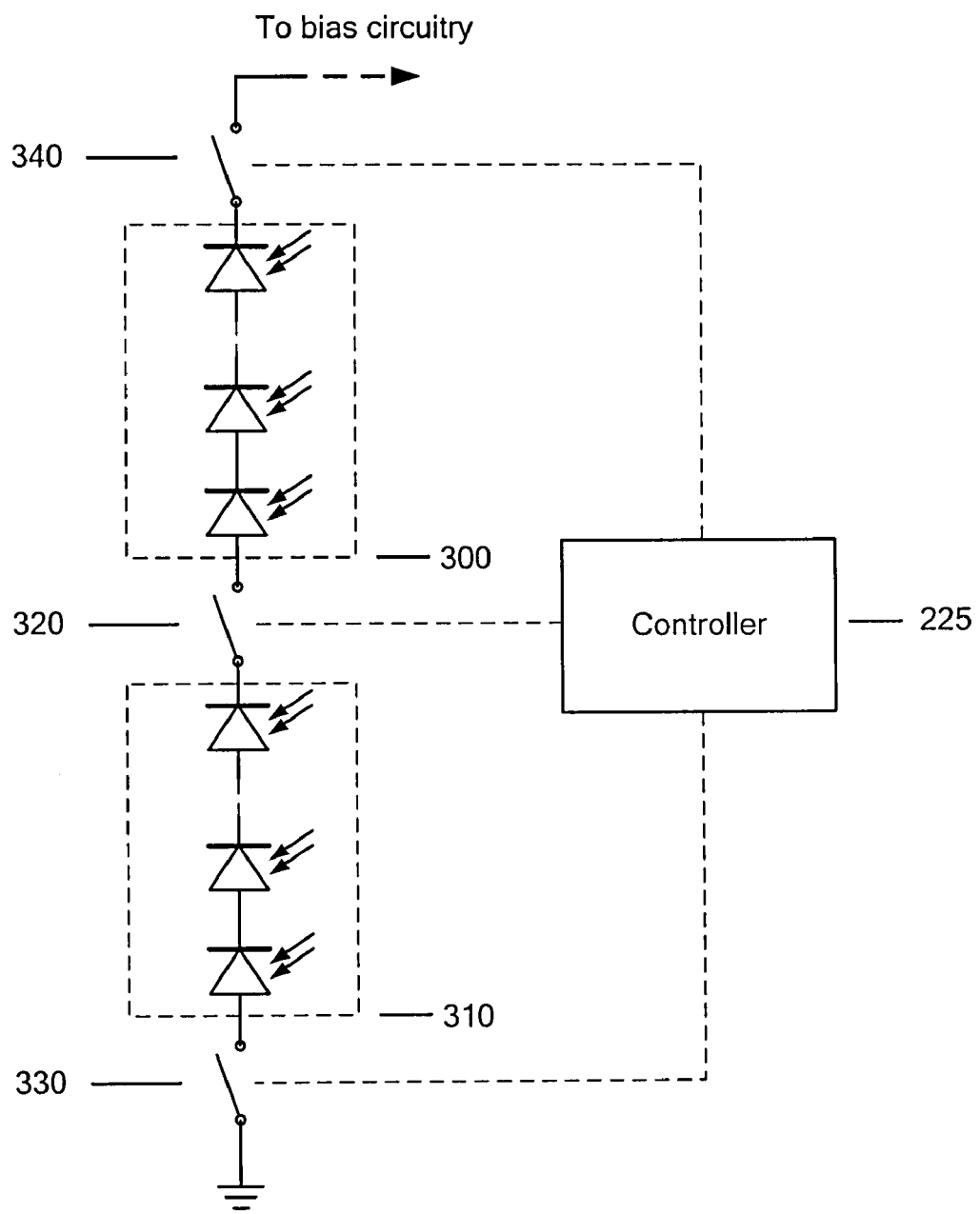
FIG. 20 shows two diode stacks, separated by a switch, and having switches at each end, wherein one terminal of one endmost switch is connected to the bias circuitry, whilst one terminal of the other endmost switch is connected to ground in accordance with an embodiment of the invention.

FIG. 20 shows a device in accordance with a seventh embodiment of the invention, in which two series connected diode stacks 300 and 310, of the kind previously described, are connected in series yet separated by a switch 320. The stacks are connected such that the anode end of stack 300 is connected to one terminal of the switch 320, the other terminal of the switch 320 being connected to the cathode of the remaining stack 310. The anode of the stack 310 is connected to the first terminal of a switch 330, whose second terminal is connected to ground. The cathode of the stack 300 is connected to the first terminal of a switch 340, whose second terminal is connected to the bias circuitry. By including switches within the diode stack, charge pumping is further reduced in the case when unequal transient voltage perturbations are generated throughout the stack. When the stack has a conductive shield layer, the switches may be operated as shown in FIGS. 16 and 17. When the stack does not have a conductive shield layer, the switches may be operated as shown in FIG. 13, 14 or 15.

Figure 21:
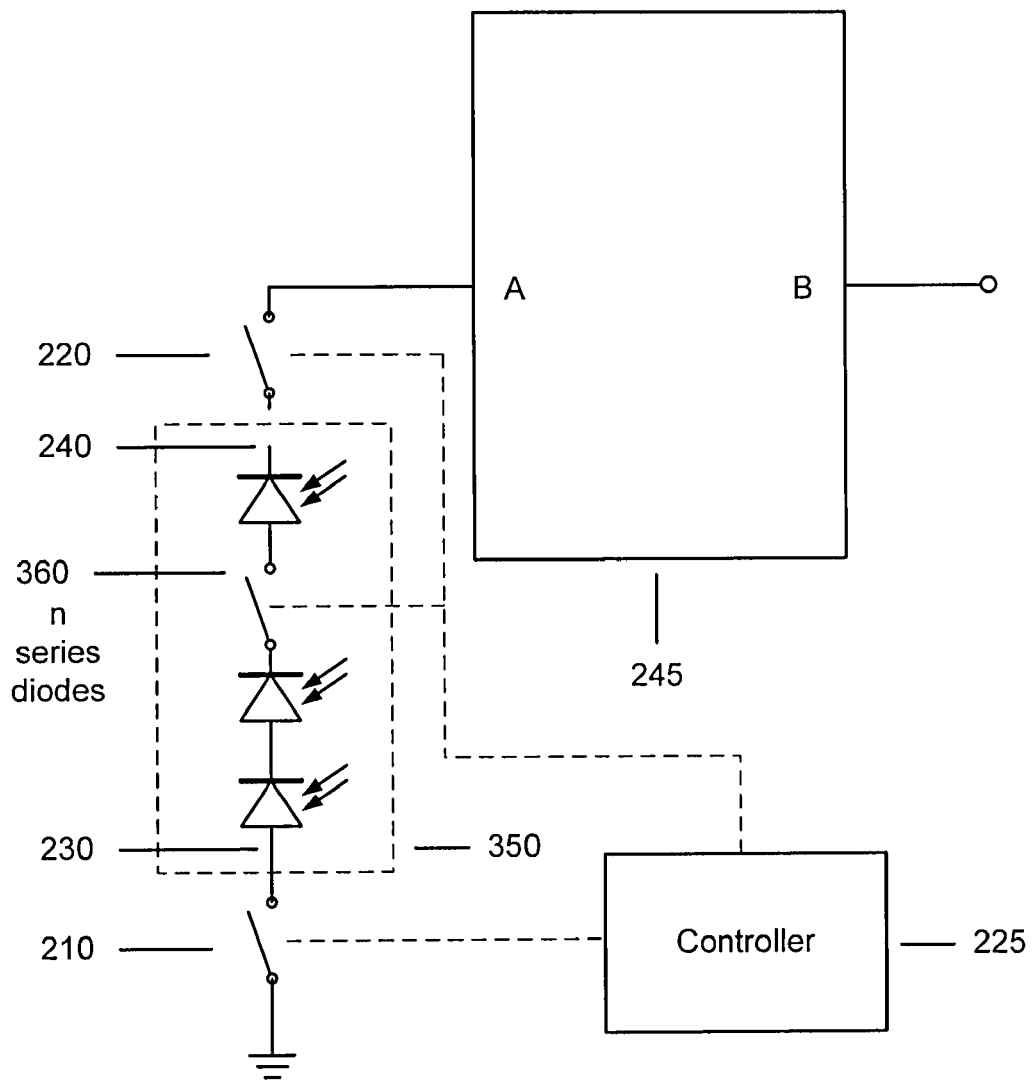
FIG. 21 is a schematic diagram which shows a switch within the diode stack in accordance with an embodiment of the present invention.

FIG. 21 shows a device in accordance with an eighth embodiment of the invention. The embodiment of FIG. 21 is similar to the embodiment shown in FIG. 12, except that the diode stack 350 includes at least one switch 360 electrically coupled between two photodiodes of the stack. When the stack has a conductive shield layer, the switches may be operated as shown in FIGS. 16 and 17. When the stack does not have a conductive shield layer, the switches may be operated as shown in FIG. 13, 14 or 15. While FIG. 21 shows switches at the ends of the stack and within the stack, it is possible that switches be provided only within the stack (between photodiodes of the stack). In such configuration, the ends of the stack may be directly coupled to the bias source.

In all embodiments described above, the anode end of the series connected diode stack, shown connected to ground, may equally be connected to a dc voltage source. Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. An ambient light sensor (ALS), comprising:
   a first diode stack including at least two photodiodes, wherein a cathode of one of the at least two photodiodes is electrically connected to an anode of another of the at least two photodiodes;
   a bias source for providing a bias voltage to the first diode stack; and
   at least one switch electrically connected to the first stack, said at least one switch operative to selectively apply the bias voltage to and remove the bias voltage from the first diode stack.

2. The ALS according to claim 1, wherein the at least one switch comprises a first switch and a second switch, and wherein the first switch is electrically connected between an end-most anode of the first diode stack and signal common, and the second switch is electrically connected between an end-most cathode of the first diode stack and the bias source.

3. The ALS according to claim 1, further comprising at least one additional diode stack including at least two photodiodes, wherein a cathode of one of the at least two photodiodes is electrically coupled to an anode of another of the at least two photodiodes, and wherein the first diode stack and the at least one additional diode stack are electrically connected to one another in a series connection.

4. The ALS according to claim 3, wherein the at least one switch comprises a plurality of switches, and one of the plurality of switches electrically couples the first stack to the at least one additional stack.

5. The ALS according to claim 1, wherein the at least one switch comprises a plurality of switches, and one of the plurality of switches electrically couples the cathode of the one photodiode of the first stack to the anode of the another photodiode of the first stack.

6. The ALS according to claim 5, wherein another of the plurality of switches electrically couples the cathode of the one photodiode of the additional diode stack to the anode of the another photodiode of the additional diode stack.

7. The ALS according to claim 1, wherein the at least one switch comprises at least one of an n-channel transistor or a p-channel transistor.

8. The ALS according to claim 1, further comprising a controller for controlling an open and closed state of the at least one switch.

9. A display module, comprising:
   the ALS according to claim 8; and
   a counter-electrode for varying a local electric field, the counter-electrode capacitively coupled to the first stack and subjected to a first electrical waveform, wherein the controller is configured to open and close the at least one switch to correspond with transitions in the first electrical waveform.

10. The display module according to claim 9, wherein the controller is configured to open and close the at least one switch to correspond with a period of the first electrical waveform.

11. The display module according to claim 10, wherein the controller is configured to close the at least one switch during high or low half cycles of the first electrical waveform.

12. The display module according to claim 10, wherein the controller is configured to close the at least one switch once every second high pulse or every second low pulse of the first electrical waveform.

13. The display module according to claim 10, wherein the controller is configured to open the at least one switch during at least one of rising or falling edges of the first electrical waveform.

14. The display module according to claim 10, further comprising a shield layer capacitively coupled to the first stack, said shield layer subjected to a second electrical waveform different from the first electrical waveform, wherein the controller is configured to close the at least one switch following each transition of the first electrical waveform.

15. The display module according to claim 14, wherein the second waveform is derived from the first waveform.

16. The display module according to claim 10, further comprising a shield layer capacitively coupled to the first stack, said shield layer subjected to a second electrical waveform different from the first electrical waveform, wherein the controller is configured to close the at least one switch following each second transition of the first electrical waveform.

17. The display module according to claim 14, wherein the controller is configured to open the at least one switch before a new transition of the first electrical waveform.

18. The display module according to claim 10, wherein the at least one switch is electrically connected between an end-most cathode of the first diode stack and the bias source, and wherein the controller is configured to open the at least one switch every low half cycle of the first electrical waveform.

19. The display module according to claim 10, wherein the at least one switch is electrically connected between an end-most anode of the first diode stack and signal common, and wherein the controller opens the at least one switch every high half cycle of the first electrical waveform.

20. The display module according to claim 10, wherein the controller is configured to close the at least one switch only when the first electrical waveform is static.

21. The display module according to claim 9, further comprising a backlight.

22. A method for preventing charge pumping in a series connected diode stack of a display device's ambient light sensor (ALS), the diode stack including at least two photodiodes, wherein a cathode of one of the at least two photodiodes is electrically connected to an anode of another of the at least two photodiodes, the ALS including a bias source for generating a bias voltage for the diode stack, and the display device including a counter electrode for generating an electric field, the method comprising selectively applying the bias voltage to and removing the bias voltage from the diode stack based on transient voltages on the counter electrode.

23. The method according to claim 22, wherein selectively applying the bias voltage to and removing the bias voltage from the diode stack includes using a switch to apply the bias voltage to and remove the bias voltage from the diode stack.

24. The method according to claim 22, wherein selectively applying the bias voltage to and removing the bias voltage from the diode stack includes applying and removing the bias voltage based on a periodic waveform applied to the counter-electrode.

25. The method according to claim 24, wherein selectively removing the bias voltage includes removing the bias voltage from the stack with each rising or falling edge of the periodic waveform.

26. The method according to claim 24, wherein selectively removing the bias voltage includes removing the bias voltage every second high or low pulse of the periodic waveform.

27. The method according to claim 24, wherein the at least one switch is electrically connected between an end-most cathode of the diode stack and the bias source, and wherein selectively removing the bias voltage includes opening the at least one switch on a low pulse of the periodic waveform.

28. The method according to claim 24, wherein the at least one switch is electrically connected between an end-most anode of the diode stack and signal common, and wherein selectively removing the bias voltage includes opening the at least one switch on a high pulse of the periodic waveform.

29. The method according to claim 22, wherein the display device includes a shield layer capacitively coupled to the diode stack, and wherein selectively applying the bias voltage to the diode stack includes applying the bias voltage following each transient on the counter electrode.

* * * * *